United States Patent [19]

Haq

[11] Patent Number: 4,536,521

[45] Date of Patent: Aug. 20, 1985

[54] POROUS CROSS-LINKED ABSORBENT POLYMERIC MATERIALS

[75] Inventor: Zia Haq, Merseyside, England

[73] Assignee: Lever Brothers Company, New York, N.Y.

[21] Appl. No.: 530,167

[22] Filed: Sep. 7, 1983

[30] Foreign Application Priority Data

Sep. 7, 1982 [GB] United Kingdom ............... 8225415

[51] Int. Cl.³ ............................................. C08J 9/28
[52] U.S. Cl. ..................................... 521/146; 521/62; 521/63; 521/64; 521/147
[58] Field of Search ................... 521/146, 147, 56, 60, 521/62, 63, 64

[56] References Cited

FOREIGN PATENT DOCUMENTS

| 1078055 | 8/1967 | United Kingdom . |
| 1116800 | 6/1968 | United Kingdom . |
| 1236313 | 6/1971 | United Kingdom . |
| 1483587 | 8/1977 | United Kingdom . |

*Primary Examiner*—Morton Foelak
*Attorney, Agent, or Firm*—Milton L. Honig; James J. Farrell

[57] ABSTRACT

Porous, cross-linked polymeric materials comprising hydrocarbon residues can be sulphonated to produce sulphonated polymers which are able to absorb large volumes of ionic solutions and also act as ion-exchange resins.

7 Claims, No Drawings

POROUS CROSS-LINKED ABSORBENT POLYMERIC MATERIALS

This invention relates to porous polymeric materials, more particularly to cross-linked polymeric materials comprising hydrocarbon residues which can be sulphonated.

In our co-pending European patent application No. 82301199.4 we have disclosed novel, porous polymeric materials and methods for their manufacture.

The present invention is concerned with the sulphonation of some forms of polymeric material disclosed in this earlier application and other polymeric materials which can be formed by an analogous process.

More particularly, this invention is concerned with sulphonated, porous, cross-linked materials which have an outstanding ability to absorb solutions such as saline (sodium chloride solutions) as well as pure water.

Depending on the monomers used and the pore volume and degree of cross-linking of the resultant polymer and the extent of subsequent sulphonation of the polymer, products are formed which have the ability to repeatedly absorb aqueous liquids after they have previously been expelled from the product by pressure. Such products also retain the absorbed liquid against normal gravitational forces.

Finally, certain moderately to highly sulphonated materials provided by this invention with a limited degree of cross-linking demonstrate a remarkable ability, after drying of collapsing to a hard granular form, which is capable of absorbing with appreciable swelling quantities of liquid significantly in excess of the quantities relating to the pore volume of the original polymer.

Various polymeric materials have been proposed over a number of years for absorption of water and body fluids such as urine and blood, but hitherto, although many of these previously proposed materials absorbed significant quantities of water, those hitherto proposed have generally been very much less absorbent of solutions containing soluble salts.

For example, British Patent Specification No. 1 236 313 discloses cross-linked cellulose material, especially manufactured to absorb body fluids, which can absorb up to 30 times its own weight of water, but no more than 12 times its own weight of a 1% sodium chloride solution.

Other earlier work has involved the preparation of cross-linked polystyrene resin in various forms which can be given ion exchange properties. For example, British Patent Specification No. 1 078 055 discloses the preparation of macroreticular structured copolymers which can be sulphonated but as stated in page 3 of the specification the water content ranges from between 5% and up to 70%. In the detailed examples only significantly lower water contents are described with a corresponding low porosity.

British Patent Specification No. 1 116 800 discloses the preparation of the well known cross-linked polystyrene beads suitable for sulphonation and subsequent use as ion exchange resin beads.

British Patent Specification No. 1 483 587 also relates to the preparation of bead polymers but of porous nature due to the solvent mixture used for the polymerisation process. The beads can be subsequently reacted with sulphuric acid and like materials to generate ion exchange resin beads.

The present invention provides a sulphonated, porous, cross-linked polymeric material comprising sulphonated hydrocarbon residues prepared by sulphonating a porous, cross-linked polymeric material having a pore volume in the range greater than 3.0 up to 99.5 cc/g, the sulphonated material having an absorbency for 10% aqueous sodium chloride of at least 3 g/g of dry sulphonated material or salt thereof.

The hydrocarbon residues may be provided by, for example, styrene or o-vinyl toluene and the cross-linking can conveniently be achieved using divinyl benzene.

At least 15% by weight of the monomers used should be capable of being sulphonated and conveniently be styrene or styrene equivalent. Comonomers can include alkyl acrylates, methacrylates and other suitable monomers. The divinyl benzene commercially available normally contains up to about 50% of ethyl vinyl benzene and this material has been used in the development of this invention and quantities quoted are in respect of the commercial material including 50% by weight of ethyl vinyl benzene.

Conveniently, the porous, homogenous, cross-linked block material is prepared by a process as described in our co-pending European patent application No. 82301199.4, according to which a high internal phase water-in-oil emulsion is prepared with the monomer and cross-linking agent as continuous phase and polymerised to yield the cross-linked block material containing, in its pores, water.

It has been found that materials having a lower pore volume than that of the porous materials disclosed in our co-pending European patent application, are useful in the present invention and we believe that such polymers in sulphonated form are novel.

As mentioned in our co-pending European patent application No. 82301199.4, the porosity of the porous, polymeric material is related to aspects of viscosity and to water and surfactant content in the unpolymerised emulsion and to speeds of stirring and the like. These same criteria apply to the more dense porous materials which can be sulphonated to produce the products of the present invention.

The pore volume, degree of cross-linking and degree of sulphonation, which in turn is, in the upper range, related to the content of monomer capable of being sulphonated, all have an effect on the properties of the final sulphonated polymer.

Three broad ranges of properties have been observed.

The first type of product, typically based on polystyrene, is a powder which readily absorbs aqueous liquid without showing any tendency to swell. Moreover, its absorbence capability is usually below that quantity which relates to the original polymer pore volume. Such properties are typically exhibited by products based on polymers having a pore volume in the range 3 to 99.5 cc/g, which are at least 20% cross-linked, irrespective of their degree of sulphonation. Similar properties are shown by products of this pore volume range which are 10% cross-linked and whose degree of monosulphonation is a maximum of 80%, and alternatively, by such products where the cross-linking and monosulphonation is a maximum of 5% and 25% respectively. The maximum water absorbency (30 g/g anhydrous product basis) is observed for a product of pore volume 45 cc/g, cross-linking 20% and monosulphonation 78%.

The second type of product, also based on polystyrene, is a flaky powder which is moderately collapsed cross-linked and sulphonated. With an accompanying moderate amount of swelling, it is capable of absorbing a quantity of aqueous liquid which typically relates to a volume 3 to 6 times that of the original polymer pore volume. This property is exhibited by products based on a polymer of pore volume 11 cc/g provided the levels of cross-linking and monosulphonation are a maximum 5% and close to a minimum 30% respectively. In addition, this property is available from products derived from polymers of pore volume 45 cc/g, having 10% cross-linking if the monosulphonation level is greater than 40%. The anhydrous products have a bulk density in the range 0.2 to 0.3 g/cc and the maximum water absorbency 90 g/g is found for a product having a pore volume 45 cc/g, cross-linking 10% and monosulphonation 86%.

The third type of product exists in a brittle granular form, which constitutes a severely collapsed physical structure compared with the original polymer. It typically has a bulk density in the range 0.6 to 0.7 g/cc, is more highly sulphonated than the previous form and is capable of absorbing extremely large quantities of aqueous liquid. When absorbing such liquids the products swell so that they can accommodate quantities which typically relate to volume 6 to 18 times that of the original pore volume. This property is exhibited by products based, typically, on polystyrene of pore volume 11 cc/g, provided the levels of cross-linking and monosulphonation are a maximum of 2.5 and a minimum of 65% respectively. Equally, the property is shown by a product of pore volume 45 cc/g if the cross-linking and monosulphonation levels are either maximum 2.5% and minimum 40% respectively, or maximum 5% and minimum 60% respectively. The maximum water absorbency (>170 g/g) has been found in products whose original pore volume is 45 cc/g provided their cross-linking and monosulphonation are a maximum 5% and minimum 95% respectively.

Although the above examples refer only to sulphonated polystyrene products, such properties can be found in products derived from other sulphonatable polymers. However, as those skilled in the art will recognise, alternative polymers will, for example, have different physical flexibility, glass transition points and inherent polarity. These factors will affect the level of pore volume, cross-linking and sulphonation required to give products similar in behaviour to those three general categories described above.

A block polymer which is suitable for sulphonation can be prepared by first forming a water-in-oil high internal phase emulsion where the oil phase is constituted by the hydrocarbon monomer or mixture of monomers, together with the cross-linking agent. The polymerisation initiator or catalyst can be dissolved in either the water phase or the oil (monomer) phase. The high internal phase emulsion system is prepared by the slow addition of the aqueous internal phase to the oil (monomer) phase, in which the emulsifying agent (surfactant) is preferably dissolved, using a moderate, shear stirring. Conveniently, the container which has a hydrophobic surface in which the polymerisation is carried out is enclosed to minimise the loss of volatile monomers and the emulsion is thermally polymerised in the container.

Conveniently, the sulphonation is carried out in the wet form soon after the polymerisation has been completed, using a sequence of increasingly concentrated sulphuric acids and, finally, oleum.

Alternatively, the porous material can be dried under vacuum or in dry air at moderately elevated temperatures of the order of 40° C. and treated with sulphur trioxide gas or any other appropriate sulphonating agent, e.g. concentrated sulphuric acid or an $SO_3$/triethyl phosphate complex. In these preparations it has been found beneficial to prewash the polymer to remove the emulsifying agent prior to sulphonation using for example isopropyl alcohol (IPA).

Experimental quantities of the sulphonated polymeric material were prepared according to two methods:

PREPARATION METHOD A (EXAMPLES 1–7)

Sulphonated polymer was made by taking a 1 cm thick disc of the wet polymerised material and sandwiching it in the plates of a Hartley funnel. The material was washed with water followed by progressively increasing concentrations of cold sulphuric acid (25%, 50%, 75% and 98%) drawn through the sample by water pump vacuum. Finally, oleum was filtered through the disc which was then left soaking in the oleum for the required time, depending on the degree of sulphonation required. The sulphonated polymer sample was then washed until the washing water was free of acid and dried overnight in an oven at about 40° C.

Samples using this general procedure were prepared and the amount of water and of 10% and 20% sodium chloride solutions which could be absorbed was determined. Samples of the sulphonated material were placed in the appropriate liquids for periods of 5 minutes and then removed from the liquid and the excess liquid removed from the surface of the sulphonated polymer sample. The amount of liquid taken up was then determined by weight difference, subtracting the weight of the dry sample, prior to immersion, from that of the immersed sample from which excess liquid had been carefully removed.

As shown in examples 1 to 7 this general procedure was used to prepare various porous, homogeneous, cross-linked block polymers, which were subsequently sulphonated. Each sample was subsequently assayed for its degree of monosulphonation and its ability to absorb water and sodium chloride solution. The percentage sulphonation figure in the examples is the $SO_3$ content of the sulphonated polymer on a weight/weight basis.

| Examples: | PREPARATION METHOD A | | | | | | |
| --- | --- | --- | --- | --- | --- | --- | --- |
| | 1 | 2 | 3 | 4 | 5 | 6 | 7 |
| Styrene (cc) | 10 | 10 | 10 | 10 | 10 | 10 | 10 |
| Divinyl benzene (cc) | 1 | 1 | 1 | 1 | 1 | 1 | 1 |
| Sorbitan mono-oleate (g) (Surfactant) | 2 | 2 | 2 | 2 | 2 | 2 | 2 |
| % Cross-linking | 5 | 5 | 5 | 5 | 5 | 5 | 5 |
| Water (cc) + | 50 | 100 | 150 | 200 | 300 | 450 | 300 |
| sodium persulphate (g) | 0.1 | 0.2 | 0.3 | 0.4 | 0.6 | 0.9 | 0.6 |
| Pore volume of* polymers (cc/g) | 5 | 10 | 14 | 19 | 29 | 43 | 29 |

-continued

| Examples: | PREPARATION METHOD A | | | | | | |
|---|---|---|---|---|---|---|---|
| | 1 | 2 | 3 | 4 | 5 | 6 | 7 |
| Sulphonation technique (oleum soak (hours)) | 3 | 16 | 15 | 16 | 17 | 16 | 24** |
| Degree of sulphonation (% sulphonate groups per benzene ring) | 68 | 79 | 80 | 80 | 68 | 77 | 20 |
| Percentage sulphonation | 34 | 38 | 38 | 38 | 34 | 37 | 13 |
| Liquid uptake (liquid per unit weight of dry sulphonated polymer) | | | | | | | |
| Water | 17 | 26 | 40 | 47 | 76 | 95 | 31 |
| 10% NaCl | 13 | 17 | 29 | 44 | 59 | 103 | 31 |
| 20% NaCl | 13 | 17 | 24 | 34 | 65 | 112 | 32 |

*Calculated as:
$$\frac{\text{Volume water}}{(\text{Volume styrene} + 0.5 \text{ volume divinyl benzene})}$$
i.e. approx 50% of Divinyl benzene as quoted is ethyl vinyl benzene. Determined after washing with IPA but before sulphonation.
**98% sulphuric acid.

From examples 1–7 it will be noted that the general amount of liquid uptake is directly related to the percentage voids, or density of the porous polymer provided the degree of sulphonation exceeds 68%. Equally it will be noted that the order of magnitude of uptake of water or relatively concentrated sodium chloride solutions is more closely related to the porosity of the block than to the salt concentration in the liquid taken up. This differs very significantly from the prior art publications.

PREPARATION METHOD B (EXAMPLES 8–17 & 22–23 AND COMPARATIVE EXAMPLES 18–21)

Wet porous polymer was cut into 1 cm cubes, dried overnight at 40° C., then cleansed of residual surfactant by treatment with isopropanol (IPA) under soxhlet reflux for two hours. After further drying at 40° C., the cleansed 1 cm cubes were treated with an excess of 98% sulphuric acid at 95° C. for varying times to provide a range of sulphonated polymers. In the initial stages of the sulphonation it was found to be beneficial to apply a vacuum to assist penetration of the reagent into the porous polymer structure. The reaction products were drained of excess sulphuric acid by filtration under vacuum and subsequently washed with water until the washings were acid-free and dried overnight at 80° C. Samples prepared in this manner were assayed for degree of sulphonation (by acid-base titration) and for their absorptive properties with water and 10% aqueous sodium chloride.

DETERMINATION OF ACIDITY

Approx. 100 mg samples of sulphonated polymer were added to 25 mls of 0.02N. NaOH solution. After a 30 minute period of thorough shaking the resultant solution was back titrated to a phenolphthalein endpoint using 0.02N HCL. The extent of polystyrene monosulphonation was calculated according to the following relationship: 184 mg of 100% monosulphonated polystyrene = 1 ml of N.NaoH.

It should be noted in Examples 22 and 23 that the percentage sulphonation has not been stated since the action of strong acid on the ester monomer has not been determined and a figure for sulphonation cannot be given using this technique.

DETERMINATION OF WATER AND 10% AQUEOUS SODIUM CHLORIDE ABSORBENCY

Approx. 100 mg samples of sulphonated polymer were saturated with the test fluid in a Petri dish. After 10 minutes the excess fluid was withdrawn and the amount of absorbed fluid determined by weight.

| Examples: | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|
| Styrene (cc) | 10.5 | 10.0 | 10.0 | 10.5 | 10.5 | 10.5 | 10.5 | 7.0 | 9.0 | 9.0 | 10.0 | 9.0 | 10.0 | 9.0 | 7.0 | 7.0 |
| Butyl methacrylate (cc) | | | | | | | | | | | | | | | 3.0 | 3.0 |
| Divinyl Benzene (cc) | 0.5 | 1.0 | 1.0 | 0.5 | 0.5 | 0.5 | 0.5 | 4.0 | 2.0 | 2.0 | 1.0 | 2.0 | 1.0 | 2.0 | 1.0 | 1.0 |
| Sorbitan mono-oleate (g) | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Percentage cross-linking | 2.5 | 2.5 | 2.5 | 2.5 | 2.5 | 2.5 | 2.5 | 20 | 10 | 10 | 5 | 10 | 5 | 10 | 5 | 5 |
| Water (cc) | 90 | 90 | 390 | 123 | 490 | 490 | 390 | 390 | 390 | 490 | 19 | 19 | 30 | 30 | 300 | 300 |
| Sodium persulphate (g) | 0.18 | 0.18 | 0.78 | 0.25 | 0.98 | 0.98 | 0.78 | 0.78 | 0.78 | 0.98 | 0.10 | 0.10 | 0.17 | 0.17 | 0.6 | 0.6 |
| Pore volume (cc/g) | 8 | 9 | 37 | 12 | 46 | 46 | 36 | 43 | 39 | 49 | 2 | 2 | 3 | 3 | 29 | 29 |
| Sulphonation technique 98% H$_2$SO$_4$ at 95° C. (hrs) | 1.5 | 1.5 | 1 | 2 | 2 | 1.5 | 1.5 | 1.5 | 2 | 2 | 2 | 2 | 2 | 2 | 7* | 2 |
| % Monosulphonation (assuming max of one sulphonate group per aromatic ring) | 75 | 90 | 55 | 98 | 96 | 75 | 85 | 85 | 95 | 93 | 75 | 75 | 75 | 75 | not determined | |
| % Sulphonation | 37 | 41 | 30 | 43 | 43 | 37 | 40 | 40 | 42 | 42 | 37 | 37 | 37 | 37 | | |
| Absorbency results (g liquid/g anhydrous sulphonated polymer) | | | | | | | | | | | | | | | | |
| Water | 27 | 30 | 30 | 66 | 170 | 80 | 95 | 29 | 80 | 85 | 5 | 3 | 8 | 5 | 25 | 60 |
| 10% aq NaCl | 11 | 23 | 25 | 41 | 121 | 23 | 13 | 29 | 75 | 100 | 5 | 3 | 8 | 5 | 12 | 20 |
| Bulk density of | | | | 0.6 | 0.7 | 0.7 | 0.65 | | | | | | | | | |

-continued

| Examples: | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|
| collapsed polymer (g/cc) | | | | | | | | | | | | | | | | |

*Sulphonation carried out at room temperature.

It can be seen from the examples that various porous materials can be produced within the broad area of this invention.

Accordingly, the present invention also provides sulphonated porous cross-linked polymeric material in a dried collapsed form which has a pore volume prior to collapse greater than 8 cc/g, a degree of cross-linking less than 10% and is monosulphonated to an extent greater than 60% which polymer on contact with aqueous systems regains at least its original porosity.

In addition, this invention provides a sulphonated, porous, cross-linked, polymeric material in a dried, collapsed form in which the pore volume is in the range 8 to 99.5 cc/g and in which the degree of cross-linking is related to the pore volume and is in the range 0.5 to 8% and in which the weight percentage sulphonation is related to the pore volume and degree of cross-linking and in the range 60 to 15 respectively.

In a further preferred form this invention provides a particularly absorbent porous polymer having a pore volume greater than 35 ccs/gm a degree of cross-linking in the range 5–20% and a degree of sulphonation above 85%.

The sulphonated porous polymers provided by this invention are also useful as ion-exchange materials. They possess the expected ion-exchange capacity of, for example, sulphonated polystyrene beads, but due to their high porosity they react very much more rapidly than hitherto known material. This means, for example, that a dilute solution can be passed rapidly through a sample of the sulphonated porous polymer and a good rate of ion-exchange achieved.

I claim:

1. A sulphonated, porous, cross-linked polymeric material prepared from a process comprising polymerization of vinyl monomers in a water-in-oil high internal phase emulsion, at least about 90% by weight of the emulsion being water, the resultant polymeric structure having a pore volume in the range from 8 cc/g up to 99.5 cc/g, which polymer is then sulphonated, the sulphonated material having an absorbency for 10% aqueous chloride of at least 3 g/g of dry sulphonated material or salt thereof.

2. A sulphonated, porous, cross-linked polymeric material as claimed in claim 1, in which the degree of sulphonation is greater than 15% styrene equivalent.

3. A sulphonated, porous, cross-linked polymeric material as claimed in claim 1 or 2, in which at least 15% of the monomers to be polymerised are capable of being sulphonated.

4. A sulphonated porous, cross-linked polymeric material as claimed in claim 1 in a dried collapsed form in which the pore volume is in the range 8 to 99.5 cc/g and in which the degree of cross-linking is related to the pore volume and is in the range 0.5 to 8% and in which the weight percentage sulphonation is related to the pore volume and degree of cross-linking and in the range 60 to 15 respectively.

5. A polymeric material in a dried collapsed form as claimed in claim 4, in which the bulk density of the polymer in the collapsed form is greater than 0.5 g/cc.

6. A sulphonated porous, cross-linked polymeric material as claimed in claim 1 in which the level of cross-linking is less than 10% and the degree of sulphonation is greater than 60%.

7. A sulphonated porous, cross-linked polymeric material as claimed in claim 1 in which the pore volume is greater than 35 cc/g and the level of cross-linking is between 5 and 20% and the degree of sulphonation is above 85%.

* * * * *